US011284079B2

(12) United States Patent
Zhou

(10) Patent No.: US 11,284,079 B2
(45) Date of Patent: Mar. 22, 2022

(54) ARCHITECTURE FLEXIBLE BINARY ARITHMETIC CODING SYSTEM

(71) Applicant: Avago Technologies International Sales Pte. Limited, Singapore (SG)

(72) Inventor: Minhua Zhou, San Diego, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 16/927,855

(22) Filed: Jul. 13, 2020

(65) Prior Publication Data

US 2020/0344481 A1   Oct. 29, 2020

Related U.S. Application Data

(63) Continuation of application No. 15/798,295, filed on Oct. 30, 2017, now Pat. No. 10,757,412.

(60) Provisional application No. 62/441,949, filed on Jan. 3, 2017.

(51) Int. Cl.
| | |
|---|---|
| *H04N 19/13* | (2014.01) |
| *H04N 19/126* | (2014.01) |
| *H04N 19/52* | (2014.01) |
| *H04N 19/61* | (2014.01) |
| *H04N 19/159* | (2014.01) |
| *H04N 19/119* | (2014.01) |
| *H04N 19/91* | (2014.01) |

(52) U.S. Cl.
CPC .......... *H04N 19/13* (2014.11); *H04N 19/119* (2014.11); *H04N 19/126* (2014.11); *H04N 19/159* (2014.11); *H04N 19/52* (2014.11); *H04N 19/61* (2014.11); *H04N 19/91* (2014.11)

(58) Field of Classification Search
None
See application file for complete search history.

(56) References Cited

U.S. PATENT DOCUMENTS

| | | | |
|---|---|---|---|
| 4,633,490 A | 12/1986 | Goertzel | |
| 6,115,561 A * | 9/2000 | Fukushima | ........ G03G 15/0855 399/49 |
| 6,590,573 B1 | 7/2003 | Geshwind | |
| 7,286,710 B2 | 10/2007 | Marpe | |
| 7,379,608 B2 | 5/2008 | Marpe | |
| 7,599,435 B2 | 10/2009 | Marpe | |

(Continued)

OTHER PUBLICATIONS ip.com search report, in Office Action dated Nov. 6, 2019 from U.S. Appl. No. 15/798,295, 1 page.

*Primary Examiner* — Mohammad J Rahman
(74) *Attorney, Agent, or Firm* — Morgan, Lewis & Bockius LLP

(57) ABSTRACT

In the subject architecture flexible binary arithmetic coding system, coding circuitry of an electronic device may receive video data that is to be coded (e.g., to be encoded or decoded) by binary arithmetic coding. The coding circuitry may also compute at least one of a least probable symbol (LPS) range or a most probable symbol (MPS) range based on a multiplication operation (e.g., without performing a table look-up operation). The coding circuitry may perform binary arithmetic coding on the video data using the at least one of the LPS range or the MPS range. The computation of the LPS range and/or the MPS range using the multiplication operation may have a lower computational cost than using a table look-up operation.

18 Claims, 9 Drawing Sheets

(56) References Cited

U.S. PATENT DOCUMENTS

| | | | |
|---|---|---|---|
| 9,577,668 B2* | 2/2017 | Jahanghir | H03M 7/4006 |
| 9,871,537 B2 | 1/2018 | Sole Rojals | |
| 10,334,248 B2* | 6/2019 | Zhang | H04N 19/577 |
| 10,432,945 B2* | 10/2019 | Alshin | H04N 19/50 |
| 2004/0117714 A1 | 6/2004 | Marpe | |
| 2006/0126744 A1* | 6/2006 | Peng | H04N 19/70 |
| | | | 375/240.26 |
| 2013/0114675 A1 | 5/2013 | Guo | |
| 2013/0287120 A1* | 10/2013 | Kwon | H04N 19/91 |
| | | | 375/240.26 |
| 2014/0140400 A1* | 5/2014 | George | H04N 19/70 |
| | | | 375/240.12 |
| 2014/0169445 A1* | 6/2014 | Jahanghir | H04N 19/436 |
| | | | 375/240.01 |
| 2016/0043735 A1* | 2/2016 | Zhou | H04N 19/13 |
| | | | 341/107 |
| 2016/0353110 A1 | 12/2016 | Zhang | |
| 2016/0353112 A1 | 12/2016 | Zhang | |
| 2016/0353113 A1 | 12/2016 | Zhang | |
| 2016/0373788 A1* | 12/2016 | Gamei | H04N 19/91 |
| 2017/0195692 A1 | 7/2017 | Yu | |

* cited by examiner

ALL INTRA MAIN 10

| | OVER HM-16.6-JEM-4.0 (PARALLEL) | | | | | OVER HM-16.13-RA-SEARCH RANGE=256 | | | | |
|---|---|---|---|---|---|---|---|---|---|---|
| | Y | U | V | ENCT | DECT | Y | U | V | ENCT | DECT |
| CLASS A1 | 0.00% | 0.00% | 0.00% | 105% | 123% | -20.86% | -30.23% | -28.78% | 5647% | 259% |
| CLASS A2 | 0.00% | 0.00% | 0.00% | 113% | 127% | -23.37% | -32.19% | -25.14% | 5059% | 270% |
| CLASS B | 0.00% | 0.00% | 0.00% | 105% | 118% | -17.78% | -23.78% | -22.65% | 7102% | 252% |
| CLASS C | 0.00% | 0.00% | 0.00% | 99% | 110% | -18.69% | -23.47% | -26.99% | 8024% | 254% |
| CLASS D | 0.00% | 0.00% | 0.00% | 104% | 112% | -14.52% | -18.54% | -19.91% | 10038% | 409% |
| CLASS E | 0.00% | 0.00% | 0.00% | 109% | 121% | -21.38% | -28.24% | -31.09% | 4841% | 263% |
| OVERALL | 0.00% | 0.00% | 0.00% | 106% | 118% | -19.28% | -25.89% | -25.41% | 6658% | 279% |
| CLASS F (OPTIONAL) | 0.00% | 0.00% | 0.00% | 97% | 109% | -17.64% | -24.21% | -24.23% | 5456% | 236% |

RANDOM ACCESS MAIN 10

| | OVER HM-16.6-JEM-4.0 (PARALLEL) | | | | | OVER HM-16.13-RA-SEARCH RANGE=256 | | | | |
|---|---|---|---|---|---|---|---|---|---|---|
| | Y | U | V | ENCT | DECT | Y | U | V | ENCT | DECT |
| CLASS A1 | 0.00% | 0.00% | 0.00% | 103% | 107% | -27.28% | -30.96% | -33.25% | 1328% | 852% |
| CLASS A2 | 0.00% | 0.00% | 0.00% | 102% | 105% | -34.96% | -41.08% | -34.19% | 1057% | 1103% |
| CLASS B | 0.00% | 0.00% | 0.00% | 105% | 108% | -26.44% | -34.40% | -29.72% | 773% | 1114% |
| CLASS C | 0.00% | 0.00% | 0.00% | 104% | 106% | -25.63% | -29.07% | -31.53% | 1681% | 1370% |
| CLASS D | 0.00% | 0.00% | 0.00% | 105% | 106% | -25.69% | -27.80% | -29.38% | 1662% | 1817% |
| CLASS E | | | | | | | | | | |
| OVERALL (REF) | 0.00% | 0.00% | 0.00% | 104% | 106% | -27.93% | -32.75% | -31.52% | 1370% | 1206% |
| CLASS F (OPTIONAL) | 0.00% | 0.00% | 0.00% | 102% | 103% | -20.25% | -27.01% | -26.60% | 1084% | 701% |

FIG. 9A

| | LOW DELAY B MAIN 10 | | | | | | |
|---|---|---|---|---|---|---|---|
| | OVER HM-16.6-JEM-4.0 (PARALLEL) | | | | | OVER HM-16.13-RA-SEARCH RANGE=256 | |
| | Y | U | V | ENCT | DECT | Y | U | V | ENCT | DECT |
| CLASS A1 | | | | | | | | | | |
| CLASS A2 | | | | | | | | | | |
| CLASS B | -0.01% | -0.01% | -0.01% | 101% | 106% | -20.15% | -27.48% | -26.49% | 1030% | 687% |
| CLASS C | 0.00% | 0.00% | 0.00% | 105% | 106% | -20.74% | -25.38% | -27.67% | 1425% | 865% |
| CLASS D | -0.01% | -0.01% | -0.01% | 105% | 105% | -21.61% | -23.22% | -24.36% | 1359% | 1359% |
| CLASS E | -0.01% | -0.01% | -0.01% | 106% | 104% | -25.58% | -35.30% | -37.48% | 584% | 743% |
| OVERALL (REF) | -0.01% | -0.01% | -0.01% | 104% | 105% | -21.68% | -27.36% | -28.31% | 1076% | 876% |
| CLASS F (OPTIONAL) | 0.00% | 0.00% | 0.00% | 105% | 108% | -21.44% | -30.11% | -30.39% | 974% | 577% |

| | LOW DELAY P MAIN 10 | | | | | | |
|---|---|---|---|---|---|---|---|
| | OVER HM-16.6-JEM-4.0 (PARALLEL) | | | | | OVER HM-16.13-RA-SEARCH RANGE=256 | |
| | Y | U | V | ENCT | DECT | Y | U | V | ENCT | DECT |
| CLASS A1 | | | | | | | | | | |
| CLASS A2 | | | | | | | | | | |
| CLASS B | 0.00% | 0.00% | 0.00% | 105% | 111% | -25.53% | -31.43% | -29.94% | 833% | 480% |
| CLASS C | 0.00% | 0.00% | 0.00% | 103% | 107% | -23.31% | -26.71% | -28.77% | 1009% | 574% |
| CLASS D | 0.00% | 0.00% | 0.00% | 99% | 97% | -23.60% | -24.44% | -25.01% | 832% | 704% |
| CLASS E | -0.01% | -0.01% | -0.01% | 97% | 102% | -29.48% | -38.82% | -41.42% | 406% | 456% |
| OVERALL (REF) | 0.00% | 0.00% | 0.00% | 102% | 104% | -25.23% | -29.89% | -30.57% | 763% | 547% |
| CLASS F (OPTIONAL) | 0.00% | 0.00% | 0.00% | 106% | 109% | -22.49% | -30.68% | -30.84% | 709% | 453% |

*FIG. 9B*

ARCHITECTURE FLEXIBLE BINARY ARITHMETIC CODING SYSTEM

CROSS-REFERENCE TO RELATED APPLICATION

This application is a continuation of application Ser. No. 15/798,295, filed on Oct. 30, 2017, now U.S. Pat. No. 10,757,412, which claims the benefit of U.S. Provisional Application No. 62/441,949, filed on Jan. 3, 2017, the entirety of each of which is incorporated herein by reference for all purposes.

TECHNICAL FIELD

The present description relates generally to video encoding and decoding, including binary arithmetic coding of video data.

BACKGROUND

Video coding has been widely used for variety of purposes such as compression of video for ease of transport, etc. The video coding has various areas that can be improved. For example, the video coding may be improved for higher compression efficiency, higher throughput, etc.

BRIEF DESCRIPTION OF THE DRAWINGS

Certain features of the subject technology are set forth in the appended claims. However, for purpose of explanation, several embodiments of the subject technology are set forth in the following figures.

FIGS. 9A and 9B illustrate tables showing experimental results that demonstrate a compression efficiency difference between computing the LPS range based on a table look-up operation and computing the LPS range based on a multiplication operation according to one or more implementations in an architecture flexible binary arithmetic coding system.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more implementations. In one or more implementations, structures and components are shown in block diagram form in order to avoid obscuring the concepts of the subject technology.

Some video coding systems, such as, e.g., high efficiency video coding (HEVC), may utilize a form of entropy encoding for compression, such as context adaptive binary arithmetic coding (CABAC). CABAC generally involves binarization, context selection, and binary arithmetic coding to provide compression, such as lossless or lossy compression. During the binary arithmetic coding, non-binary valued symbols, such as transform coefficients or motion vectors, are binarized or converted into a binary symbol, where each bit of the binarized symbol may be referred to as a bin. The CABAC process includes updating a compound range for each bin by computing a least probable symbol (LPS) range and a most probable symbol (MPS) range. The LPS range may be computed by performing a table look-up operation on a look-up table. However, the look-up operation on the look-up table may be a costly process, especially when a size of the look-up table is large. Furthermore, storing a large look-up table may require memory or disk resources. Therefore, an alternative approach to compute the LPS range may be desired for a better trade-off between compression efficiency and implementation cost of a coding system.

The subject architecture flexible binary arithmetic coding system addresses these and other issues by improving the computational efficiency of the CABAC process. For example, in the subject system, the computation of the LPS range may not rely solely on a table lookup operation on a large lookup table, but the LPS range may also be computed on the fly using a multiplication process, e.g., multiplication and bit shifts. Computing the LPS range using the multiplication process may be more computationally efficient than utilizing a look-up table, particularly when the look-up table is large. Furthermore, the subject system may be architecture flexible in the sense that the multiplication process can be implemented in addition to the lookup table. The subject system also provides a mechanism for reducing the size of the lookup table when the lookup table is utilized.

Figure 1:
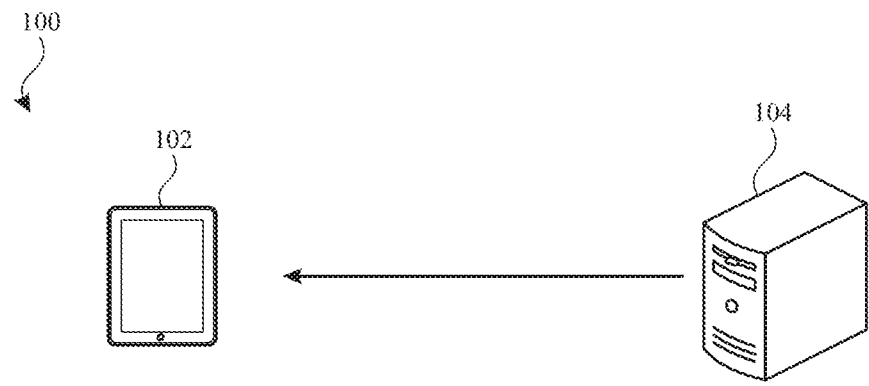
FIG. 1 illustrates an example environment in which an architecture flexible binary arithmetic coding system may be implemented in accordance with one or more implementations.

FIG. 1 illustrates an example environment 100 in which an architecture flexible binary arithmetic coding system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The environment 100 includes an electronic device 102 and a server 104. The electronic device 102 and the server 104, may be, and/or may include all or part of, the electronic system discussed below with respect to FIG. 10. The electronic device 102 is presented as an example, and in other implementations, another device may be substituted for the electronic device 102.

The electronic device 102 may be, for example, a device capable of receiving and reproducing video/image content, such as set-top-boxes, desktop computers, laptop computers, smartphones, peripheral devices (e.g., digital cameras), tablet devices, wearable devices (e.g., watches, bands, etc.), or other appropriate devices that include one or more circuits for processing video/image data. The electronic device 102 may include a wired and/or wireless communication interface, such as one or more of a cable interface, an Ethernet interface, a high-definition multimedia interface (HDMI), an NFC radio, a WLAN radio, a Bluetooth radio, a Zigbee radio, a cellular radio, and/or other wireless radios. In FIG. 1, by way of example, the electronic device 102 is depicted as a tablet device. The electronic device 102 may be, and/or may include all or part of, the electronic device discussed below with respect to FIG. 2 and/or the electronic system discussed below with respect to FIG. 10.

The server 104 may be one or more computing devices capable of providing video content to one or more other devices, such as the electronic device 102. In one or more implementations, the server 104 may be communicatively coupled to the electronic device 102, such as via a network connection and/or via a direct or peer-to-peer connection. For explanatory purposes the server 104 is described herein as a server device; however, the server 104 is not limited to a server device, and the server 104 may be and/or may include any electronic device that is communicatively coupled to the electronic device 102 and configured to provide video content to the electronic device 102.

In one example, the server 104 may include and/or be communicatively coupled to an encoder that is capable of encoding video data, such that the server 104 may compress the video data and transmit the compressed video data to the electronic device 102. The server 104 may also include and/or be communicatively coupled to a decoder to decode the compressed video data that the server 104 may receive. The electronic device 102 may include and/or may be communicatively coupled to a decoder that is capable of decoding the compressed video data received from the server 104. The electronic device 102 may also include and/or be communicatively coupled to an encoder that is capable of encoding video data, such as video data that the electronic device 102 may transmit the compressed video data to another device.

Figure 2:
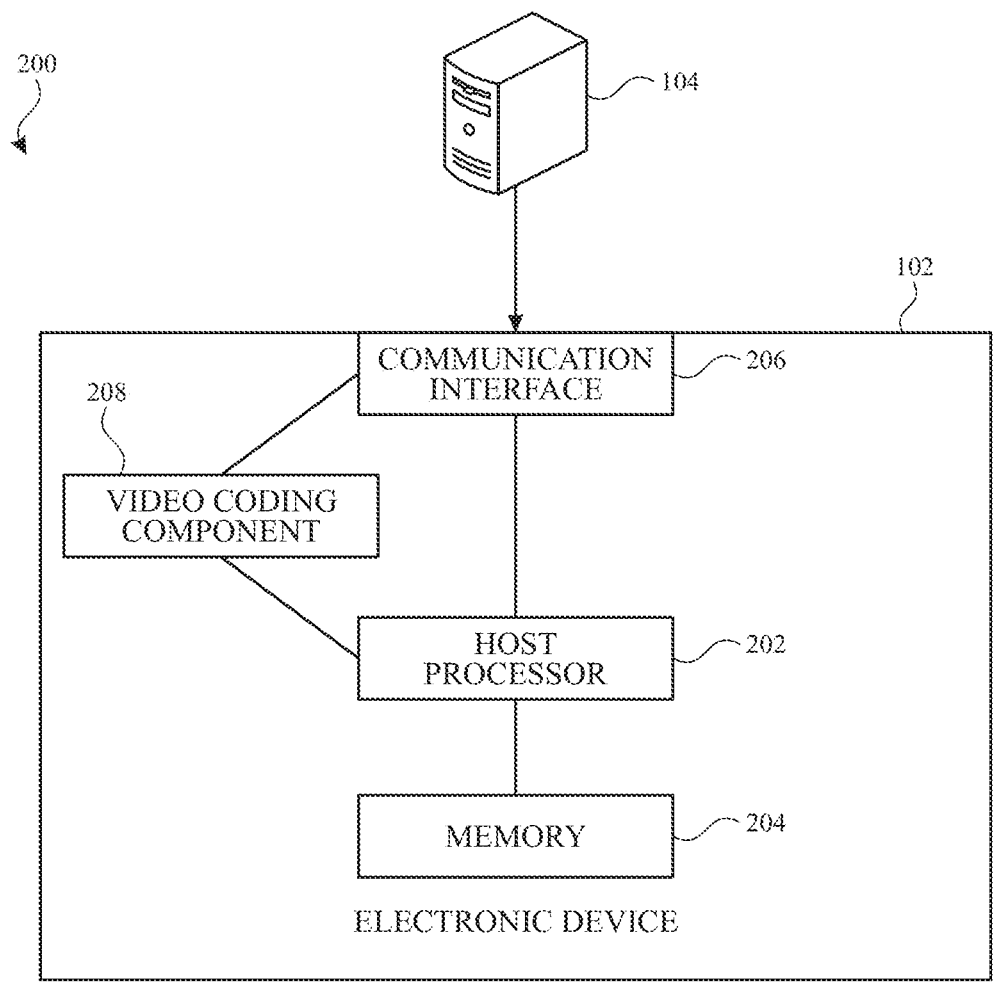
FIG. 2 illustrates an example environment including an example electronic device that may implement an architecture flexible binary arithmetic coding system in accordance with one or more implementations.

FIG. 2 illustrates an example environment 200 including an example electronic device 102 that may implement an architecture flexible binary arithmetic coding system in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The diagram 200 may include the electronic device 102 and the server 104. The electronic device 102 may include, among other components, a host processor 202, a memory 204, a communication interface 206, and a video coding component 208. The host processor 202, which may also be referred to as an application processor or other kind of processor, may include suitable logic, circuitry, and/or code that enable processing data and/or controlling operations of the electronic device 102. In this regard, the host processor 202 may be enabled to provide control signals to various other components of the electronic device 102.

The host processor 202 may also control transfers of data between various portions of the electronic device 102. Additionally, the host processor 202 may enable implementation of an operating system or otherwise execute code to manage operations of the electronic device 102. The memory 204 may include suitable logic, circuitry, and/or code that enable storage of various types of information such as received data, generated data, code, and/or configuration information. The memory 204 may include, for example, random access memory (RAM), read-only memory (ROM), flash, and/or magnetic storage.

The video coding component 208 may be configured to encode video data and to decode the compressed video data. In one or more implementations, the compressed video data may be received from another device (e.g., the server 104) via the communication interface 206, and may be decoded by the video coding component 208. The video coding component 208 may encode video data and transmit the compressed video data to another device via the communication interface 206. The video coding component 208 may include a video encoder circuit capable of encoding video data and a video decoder circuit capable of decoding the compressed video data. In one or more implementations, the host processor 202 may include all or part of the video coding component 208.

The communication interface 206 may be used by the host processor 202 to communicate via a communication protocol, such as Bluetooth, BTLE, Zigbee, or NFC, Wi-Fi, cellular, Ethernet, HDMI, or the like. In one or more implementations, the communication interface 206 may be, may include, and/or may be communicatively coupled to a first radio frequency (RF) circuit, such as a Bluetooth circuit and/or an NFC circuit, and the communication interface 206 may be, may include, and/or may be communicatively coupled to a second RF circuit, such as a WLAN circuit, a cellular RF circuit, or the like.

In one or more implementations, one or more of the host processor 202, the memory 204, the communication interface 206, the video coding component 208, and/or one or more portions thereof, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 3:
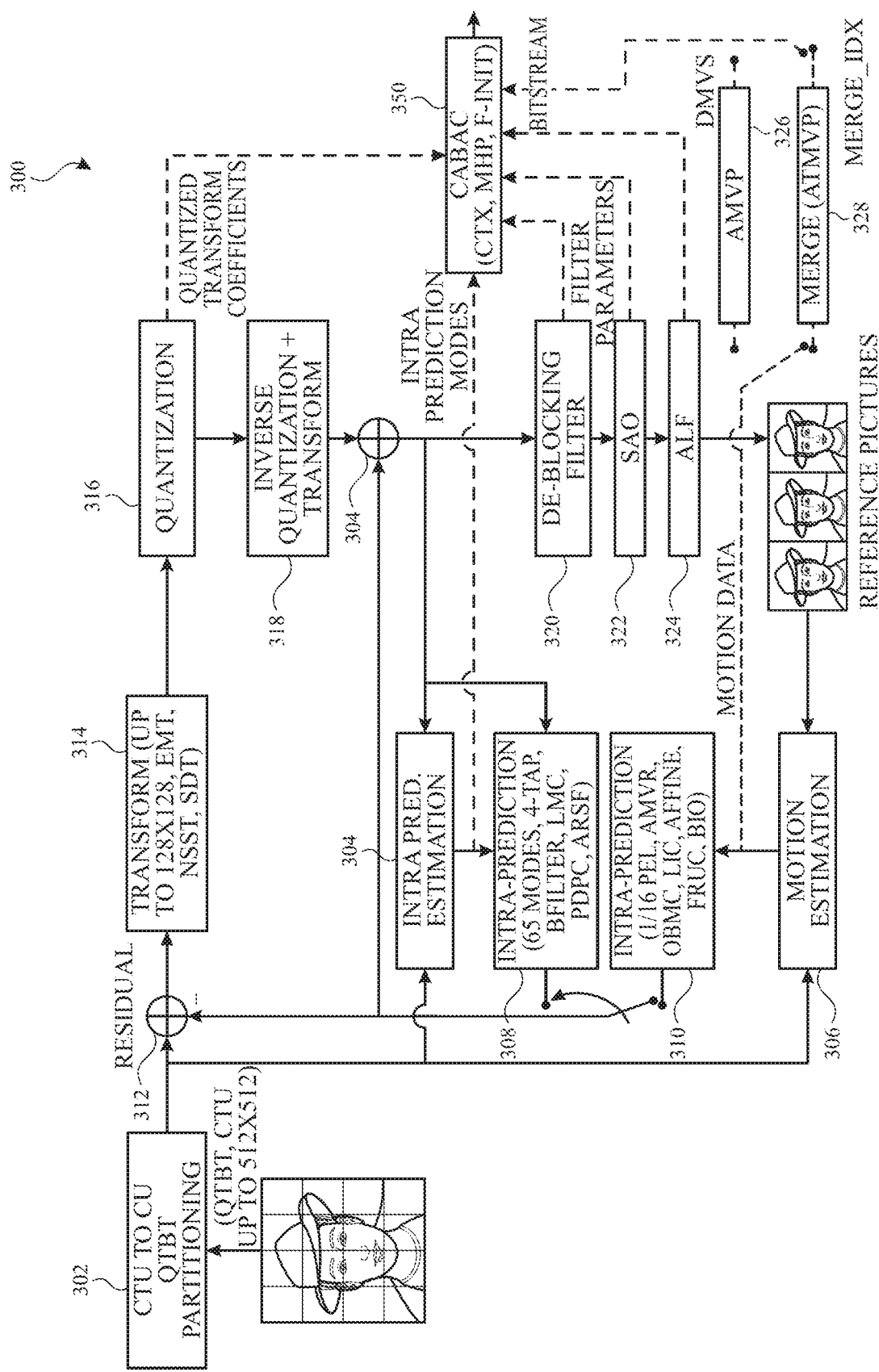
FIG. 3 illustrates a diagram of an example encoding process in accordance with one or more implementations.

FIG. 3 illustrates a diagram of an example encoding process 300 in accordance with one or more implementations. For explanatory purposes, the blocks of the process 300 are described herein as occurring in serial, or linearly. However, multiple blocks of the process 300 may occur in parallel. In addition, the blocks of the process 300 need not be performed in the order shown and/or one or more of the blocks of the process 300 need not be performed and/or can be replaced by other operations.

In one or more implementations, the encoding process 300 may be an HEVC encoder process 300 with additional features. The HEVC has been developed to provide improved compression efficiency. To achieve higher compression efficiency, the HEVC employs a flexible block coding structure. For example, in the HEVC a picture is divided into coding tree units (CTUs), and each CTU is further decomposed into coding units (CUs). The CTUs may be the same size, while the CUs may have different sizes. The sizes of the CUs may vary between a minimum CU size and a size of a CTU. For example, if a minimum CU size is 8×8 and a size of a CTU is 64×64, sizes of the CUs may vary between 8×8 and 64×64.

For each CU, a CU is divided into prediction units (PUs) for intra-prediction or inter-prediction, and is also divided into transform units (TUs) for transformation of prediction residual block. The sizes of PUs within a particular CU are smaller or equal to the size of the particular CU. The sizes of TUs within a particular CU may be smaller than the size of the particular CU (e.g., the sizes of TUs ranging from 4×4 to 32×32 when the size of CU is 64×64). Within a CTU, some CUs may be intra-coded, while other CUs may be inter-coded. Such a block structure offers coding flexibility of using different PU sizes and TUs sizes based on characteristics of incoming video content. The HEVC employs block-based intra/inter prediction, transform and quantization, entropy coding and in-loop filtering (i.e. de-blocking filter followed by a sample adaptive offset (SAO) filter) to achieve compression purpose.

For each CTU in the HEVC, CUs are generally processed with intra-prediction and/or inter-prediction mechanisms and prediction residual blocks are transformed and quantized. After the transformation and quantization, the prediction residual blocks of CUs may be reconstructed by performing inverse quantization and inverse transform, and finally the CUs may be reconstructed by adding the prediction blocks to the reconstructed prediction residual blocks followed by in-loop filtering. At a CTU level, the quantized transform coefficients along with side information such as motion data, intra/inter prediction modes, CU/PU/TU partitioning trees for the CTU are encoded into bitstream by using CABAC.

Referring to the encoding process 300 of FIG. 3, after dividing a video frame into CTUs, each of CTUs is divided into CUs (302). On each CU, intra-prediction estimation (304) is performed to produce intra prediction modes for the CU. On each CU, motion estimation (306) is performed to produce motion data for the CU. Using intra prediction modes supplied by intra-prediction estimation (304) intra-prediction (308) is performed to produce the intra prediction blocks for the CU. Using motion data supplied by motion estimation (306) inter-prediction (310) is performed to produce the inter prediction blocks for the CU. Subsequently, an intra/inter decision (312) is made to determine whether intra-prediction residual or inter-prediction residual is coded. The prediction residual (intra-prediction residual or inter-prediction residual) is transformed (314) and quantized (316). After the transformation and the quantization, the CU is reconstructed by going through a processing chain of inverse quantization and inverse transform (318), adding the intra/inter prediction blocks to the reconstructed residual blocks (304), processing through a de-blocking filter (320), processing through a sample adaptive offset (SAO) filter (322), and processing through an adaptive loop filter (ALF) (324).

The reconstructed CU is stored in a reference picture buffer. The reference picture buffer may be allocated on off-chip memory. Finally, at a CTU level, the quantized transform coefficients along with the side information for the CTU such as intra prediction modes, motion data, de-blocking filter parameters, SAO filter parameters, and ALF parameters are encoded into bitstream by using CABAC (350). The motion data is predicted by using an advanced motion vector predictor (AMVP) (326) or an advanced temporal motion vector predictor (ATMVP) (328) before being encoded using CABAC.

Figure 4:
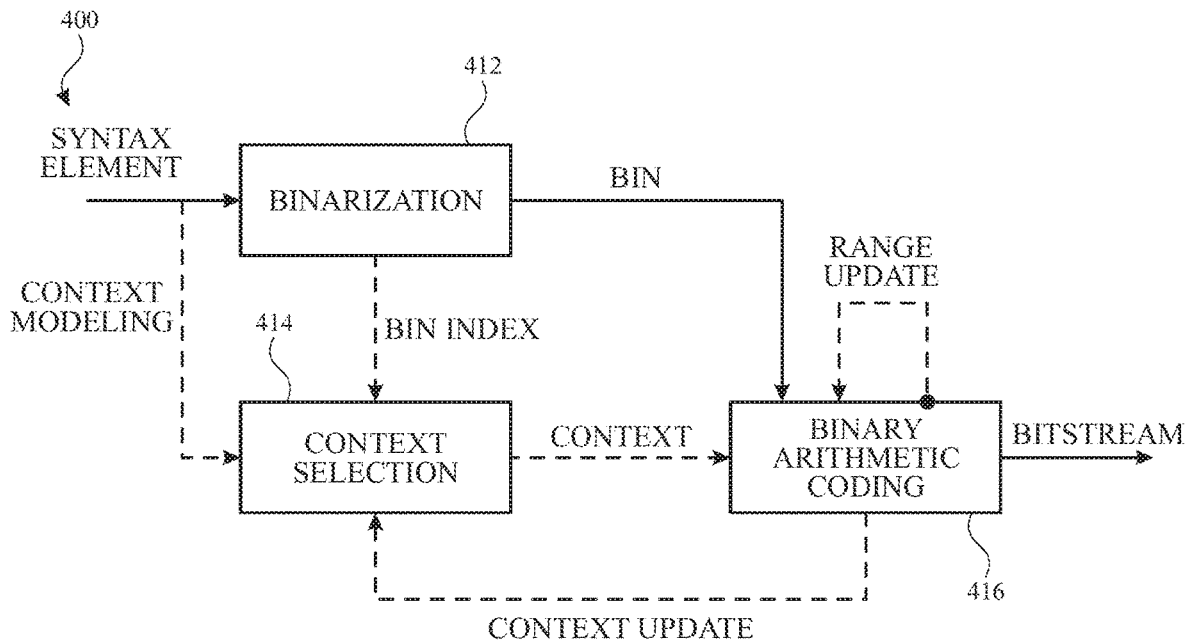
FIG. 4 is a diagram of an example context adaptive binary arithmetic coding (CABAC) encoding engine in accordance with one or more implementations.

FIG. 4 is a diagram of an example CABAC encoding engine 400 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The CABAC encoding engine 400 may include a binarization block 412, a context selection block 414, and a binary arithmetic coding (BAC) engine 416. The binarization block 412 may receive a syntax element and convert the syntax element into a sequence of bins (i.e., binary numbers). For example, the syntax element may be an element for coding the quantized transform coefficients and/or the motion data (e.g., from the encoding process 300 of FIG. 3). The binarization block 412 may provide the sequence of bins to the binary arithmetic coding engine 416 and may provide the corresponding bin indices to the context selection block 414. The context selection block 414 may select a context for a current bin based on the bin index, a previous coded bin value, and neighboring data. For example, the context may contain the most probable symbol (MPS) value (valMps, which may be 0 or 1) and probability of the most probable symbol (pMps, which may range between 0 to 1). In one example, context modeling information may be provided to the context selection block 414 such that the context selection block 414 may select the context based on the context modeling information.

Based on the context received from the context selection block 414, the binary arithmetic coding engine 416 converts each bin into bits. For example, the binary arithmetic coding engine 416 may take the context (valMps, pMps) and a value of the current bin as input, conduct BAC range update, context update for the current context, and then output bits via a range re-normalization. The binary arithmetic coding engine 416 may provide the resulting context back to the context selection block 414 to update the context in the storage.

In one or more implementations, one or more of the binarization block 412, the context selection block 414, the binary arithmetic coding engine 416, and/or one or more portions thereof, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

Figure 5:
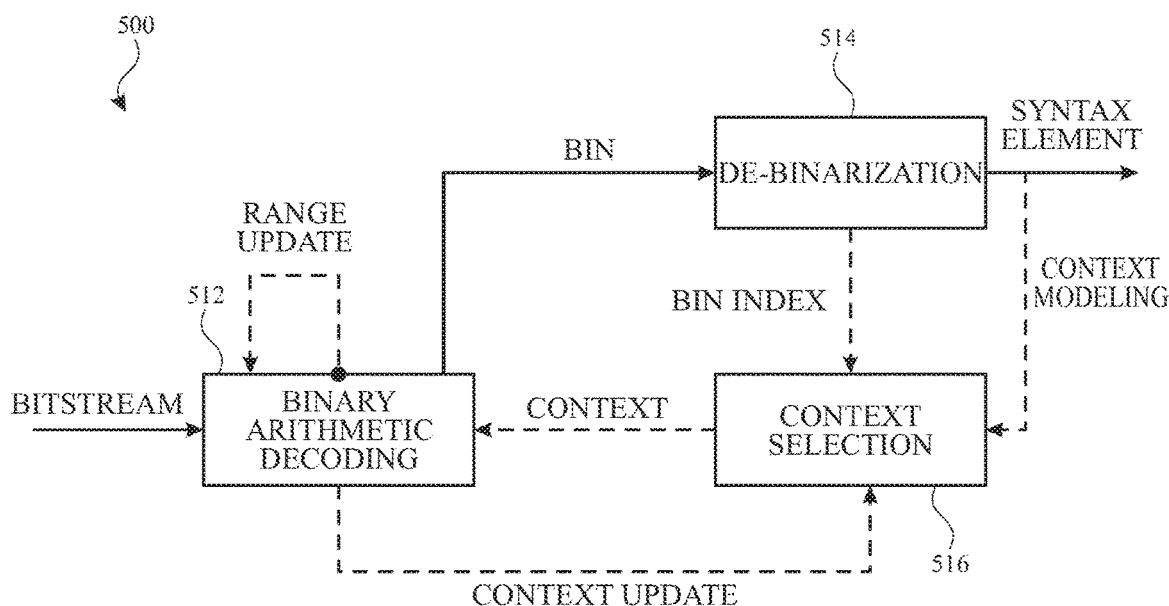
FIG. 5 is a diagram of an example CABAC decoding engine in accordance with one or more implementations.

FIG. 5 is a diagram of an example CABAC decoding engine 500 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The CABAC decoding engine 500 may perform reverse operations of the CABAC encoding engine 400 of FIG. 4.

For example, the bitstream output from the CABAC encoding engine 400 may be received by the CABAC decoding engine 500. The CABAC decoding engine 500 includes a binary arithmetic decoding (BAD) engine 512, a de-binarization block 514, and a context selection block 516. The context selection block 516 supplies the binary arithmetic decoding engine 512 with the context of the current bin. The binary arithmetic decoding engine 512 receives bits via a bit stream and reads the bits via a range re-normalization. The binary arithmetic decoding engine 512 may also take the context (valMps, pMps) of a current bin as an input, conduct a BAC range update and bin decoding to determine the value (0 or 1) of the current bin, and then perform context update for the current context. The binary arithmetic decoding engine 512 may provide the resulting context back to the context selection block 516 to update the context in storage.

The de-binarization block 514 may receive the decoded bins from the binary arithmetic decoding engine 512 and may convert the decoded bins into a syntax element. The de-binarization block 514 may also provide a bin index to the context selection block 516. The context selection block 516 may select a context for the current bin based on the bin index, a previous coded bin value, and neighboring data. For example, the context may contain the MPS value (valMps, which may be 0 or 1) and probability of the most probable symbol (pMps, which may range between 0 to 1). In one example, context modeling information may be provided to the context selection block 516 such that the context selection block 516 may select the context based on the context modeling information. The context selection block 516 may provide the selected context to the binary arithmetic decoding engine 512. In one or more implementations, one or more of the binary arithmetic decoding engine 512, the de-binarization block 514, the context selection block 516, and/or one or more portions thereof, may be implemented in software (e.g., subroutines and code), hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both.

As discussed above, the binary arithmetic coding engine (e.g., binary arithmetic coding engine 416 of FIG. 4) may perform a range update (e.g., BAC range update) to update range parameters when encoding video data, and the binary arithmetic decoding engine (e.g., binary arithmetic decoding engine 512 of FIG. 5) may perform a range update (e.g., BAC range update) to update the range parameters when decoding video data. The range parameters (e.g. BAC range parameters) may include an LPS range, an MPS range, a compound range (e.g., the sum of the LPS and MPS range), and a range offset. When the range update is performed, the LPS range may be computed by performing a table look-up operation of a look-up table. The MPS range may be computed by subtracting the LPS range from the compound range. In some instances, the look-up table used in the table look-up operation for the CABAC process may be large, e.g., significantly larger than a look-up table used in other coding methods. For example, a look-up table used for the CABAC process in a first method may have 512×64 entries, whereas a look-up table for the CABAC process in a second method may have 64×4 entries. Given that each entry of the look-up table has 9 bits of information, the size of the look-up table for the CABAC process may be 512×64×9 bits (i.e., 36,684 bytes) for the first method with 512×64 entries, and may be 64×4×9 bits (i.e. 288 bytes) for the second method with 64×4 entries. The table look-up operation used in the CABAC process may be costly especially when the size of the look-up table is significantly large. Thus, although the CABAC process in the first method may provide improved efficiency than the CABAC process in the second method, the table look-up operation used in the CABAC process for the first method may be more costly than the table look-up operation used in the CABAC process for the second method.

Accordingly, during the binary arithmetic coding, a less costly operation than the table look-up operation may be used to compute the LPS range. In one or more implementations, the LPS range may be computed using a multiplication operation, which may be less costly than using the table look-up operation. The LPS range may be computed using a multiplication operation that involves multiplication of a quantized compound range with a storage precision based value that is based on a storage precision of the compound range and a quantized probability state. Because the multiplication operation does not rely on a look-up table, the multiplication operation may be more cost-efficient than the table look-up operation. The binary arithmetic coding engine of the CABAC encoding engine and the binary arithmetic decoding engine of the CABAC decoding engine according to one or more implementations are discussed in more detail as follows.

Figure 6:
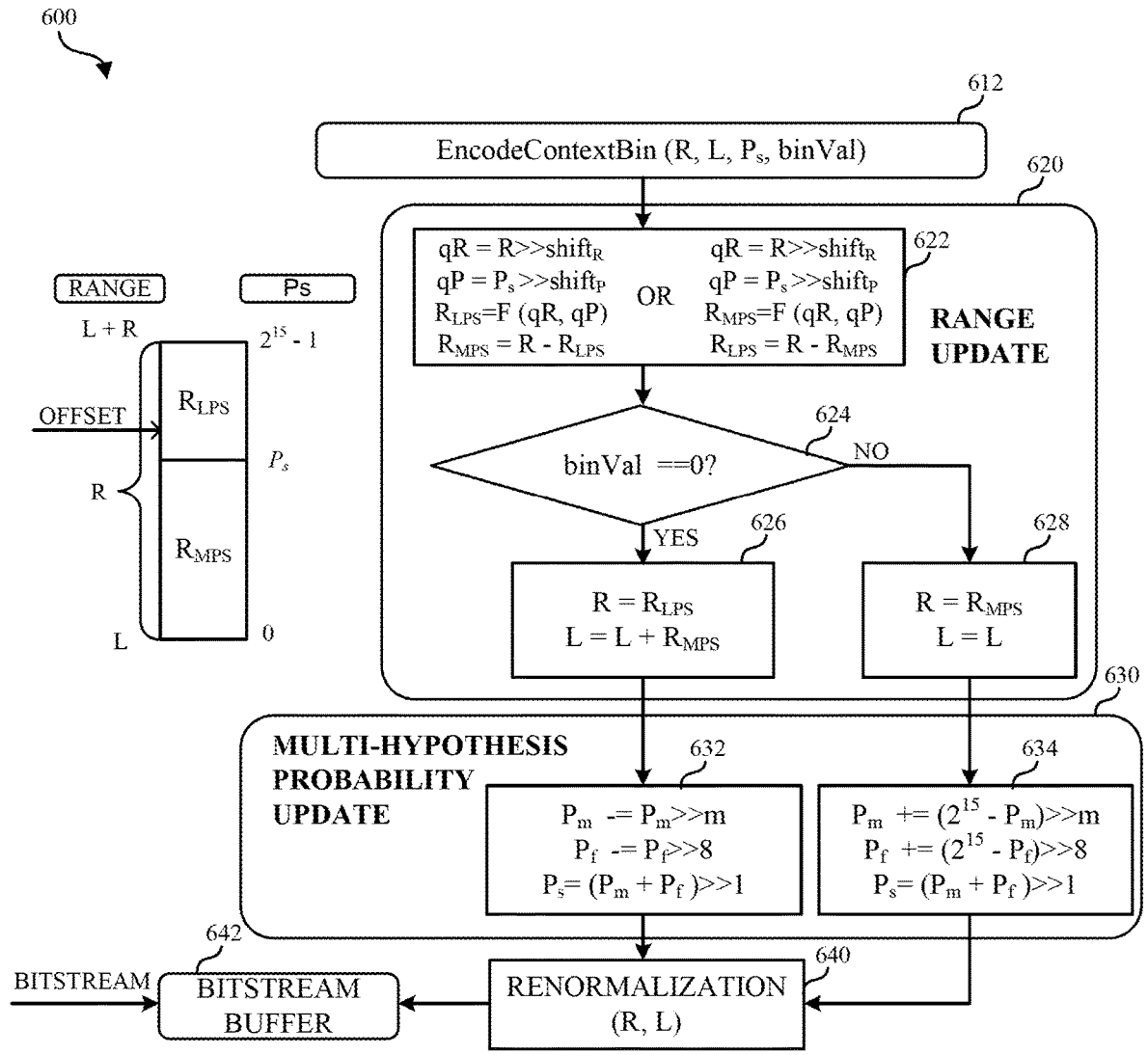
FIG. 6 illustrates a flow diagram of an example process of a binary arithmetic encoding engine for an architecture flexible binary arithmetic coding system in accordance with one or more implementations.

FIG. 6 illustrates a flow diagram of an example process 600 performed by a binary arithmetic coding engine for an architecture flexible binary arithmetic coding system in accordance with one or more implementations. For explanatory purposes, the blocks of the process 600 are described herein as occurring in serial, or linearly. However, multiple blocks of the process 600 may occur in parallel. In addition, the blocks of the process 600 need not be performed in the order shown and/or one or more of the blocks of the process 600 need not be performed and/or can be replaced by other operations.

For example, the example process 600 may be performed by the binary arithmetic coding engine 416 of FIG. 4. As discussed above, when the binary arithmetic coding engine 416 receives the context from the context selection block 414 and a value of the current bin from the binarization block 412, the binary arithmetic coding engine 416 may conduct a range update and a probability (context) update for the current bin, and then may output bits via range re-normalization.

In the example process 600, the binary arithmetic coding engine receives the compound range R, the range offset L, a probability state $P_s$, and a bin value (binVal) (612) for the range update process (e.g., BAC range update) (620). During the range update process (620), an LPS range and an MPS range may be calculated based on a multiplication function with a quantized compound range and a quantized probability state (622), instead of relying on a look-up table. In particular, the LPS range $R_{LPS}$ and the MPS range $R_{MPS}$ may be computed using a multiplication function involving the quantized compound range qR and the quantized probability state qP, a probability state shift bit $shift_p$, a range shift bit $shift_R$.

In one or more implementations, if the LPS range $R_{LPS}$ is computed using a multiplication function F(qR,qP) and either an MPS probability state or an LPS probability state is used as the probability state $P_s$, the LPS range $R_{LPS}$ and the MPS range $R_{MPS}$ may be computed according to the following equation:

$$\begin{cases} qR = R \gg shift_R \\ qP = P_s \gg shift_P \\ R_{LPS} = F(qR, qP) \\ R_{MPS} = R - R_{LPS} \end{cases}$$

In one or more implementations, if the MPS range $R_{MPS}$ is computed using a multiplication function F(qR,qP) and either an MPS probability state or an LPS probability state is used as the probability state $P_s$, the MPS range $R_{MPS}$ and the LPS range $R_{LPS}$ may be computed according to the following equation:

$$\begin{cases} qR = R \gg shift_R \\ qP = P_s \gg shift_P \\ R_{MPS} = F(qR, qP) \\ R_{LPS} = R - R_{MPS} \end{cases}$$

The quantized compound range qR may be computed by shifting the compound range R by the range shift bit $shift_R$. The quantized probability state qP may be computed by shifting the probability state $P_s$ by the probability state shift bit $shift_p$. The probability state shift bit $shift_p$ and/or the range shift bit $shift_R$ may be predefined or may be configurable.

The multiplication function F(qR,qP) may vary depending on whether the multiplication function F(qR,qP) is used to compute the LPS range $R_{LPS}$ or the MPS range $R_{MPS}$ and on whether the MPS probability state or the LPS probability state is used as the probability state $P_s$. In one or more implementations, if the multiplication function F(qR,qP) is used to compute the LPS range $R_{LPS}$ and the MPS probability state is used as the probability state $P_s$ or if the multiplication function F(qR,qP) is used to compute the MPS range $R_{MPS}$ and the LPS probability state is used as the probability state $P_s$, the multiplication function F(qR,qP) may be expressed as:

$$F(qR, qP) = \begin{cases} clip3(1, 2^{bits_R} - 1, (qR \cdot (2^{bits_P - shift_P} - qP)) \gg \\ \quad (bits_P - shift_P - shift_R)) & \text{if } qP \ge 1 \\ clip3(1, 2^{bits_R} - 1, (qR \cdot (2^{bits_P - shift_P} - 1)) \gg \\ \quad (bits_P - shift_P - shift_R)) & \text{Otherwise} \end{cases},$$

where a clipping function clip3 (a, b, x) clips x into the range of [a, b] and $bits_R$ represents a storage precision of compound range R and $bits_P$ represents a storage precision of the probability state $P_s$.

Therefore, if multiplication function F(qR,qP) is used to compute the LPS range $R_{LPS}$ with the MPS probability state as the probability state $P_s$ or to compute the MPS range $R_{MPS}$ with the LPS probability state as the probability state $P_s$, the multiplication function F(qR,qP) may be computed based on the multiplication operation that involves multiplication of a quantized compound range qR with a storage precision based value. The storage precision based value may be ($2^{bits_P - shift_P}$–qP) or ($2^{bits_P - shift_P}$–1), depending on whether qP≥1 or not. Subsequently, to finish computing the multiplication function F(qR,qP), the multiplication result produced from the multiplication operation may be shifted by ($bits_P - shift_P - shift_R$) and the clipping function clip3 may be applied the shifted multiplication result into the range of 1 and $2^{bits_R}-1$.

In one or more implementations, if the multiplication function F(qR,qP) is used to compute the LPS range $R_{LPS}$ and the LPS probability state is used as the probability state $P_s$ or if the multiplication function F(qR,qP) is used to compute the MPS range $R_{MPS}$ and the MPS probability state is used as the probability state $P_s$, the multiplication function F(qR,qP) may be expressed as:

$$F(qR, qP) = \begin{cases} clip3(1, 2^{bits_R} - 1, (qR \cdot qP) \gg \\ \quad (bits_P - shift_P - shift_R)) & \text{if } qP \ge 1 \\ clip3(1, 2^{bits_R} - 1, qR \gg \\ \quad (bits_P - shift_P - shift_R)) & \text{Otherwise} \end{cases},$$

where a clipping function clip3 (a, b, x) clips x into the range of [a, b] and $bits_R$ represents a storage precision of compound range R and $bits_P$ represents a storage precision of the probability state $P_s$.

Therefore, if multiplication function F(qR,qP) is used to compute the LPS range $R_{LPS}$ with the LPS probability state as the probability state $P_s$ or to compute the MPS range $R_{MPS}$ with the MPS probability state as the probability state $P_s$, the multiplication function F(qR,qP) is computed based on the multiplication operation that involves multiplication of a quantized compound range qR with a quantized probability state based value. The quantized probability state based value may be the quantized probability state qP or 1, depending on whether qP≥1 or not. Subsequently, to finish computing the multiplication function F(qR,qP), the multiplication result produced from the multiplication operation may be shifted by ($bits_P-shift_P-shift_P$) and the clipping function clip3 may be applied the shifted multiplication result into the range of 1 and $2^{bits_R}-1$.

After computing the LPS range $R_{LPS}$ and the MPS range $R_{MPS}$, the compound range R and the range offset L are updated based on the input bin value binVal. In particular, it is determined whether the bin value is zero or not (624). For example, the bin value may be zero or one. If the bin value is zero, the compound range R is set to the LPS range $R_{LPS}$ and the range offset L is set to L+$R_{MPS}$ (626). If the bin value is not zero (e.g., binVal=1), the compound range R is set to the MPS range $R_{MPS}$ and the range offset L is unchanged (628).

After updating the compound range R and the range offset L, a multi-hypothesis probability update (630) is performed. In particular, if the bin value binVal is zero, the probability state $P_s$ may be updated by the following equation (632):

$$P_m = P_m - (P_m \gg m)$$

$$P_f = P_f - (P_f \gg 8)$$

$$P_s = (P_m + P_f) \gg 1$$

Pm is an MPS probability state (e.g., if $P_s$ is an MPS probability state) or a LPS probability state (e.g., if $P_s$ is an LPS probability state) with the state update of context dependent rate m. Pf is an MPS probability state (e.g., if $P_s$ is an MPS probability state) or a LPS probability state (e.g., if $P_s$ is an LPS probability state) with the state update of a fixed rate (e.g., 8).

If the bin value is not zero (e.g., binVal=1) (e.g., and the probability state storage precision $bits_P$ is 15), the probability state $P_s$ may be updated by the following equation (634):

$$\begin{cases} P_m = P_m + ((2^{15} - P_m) \gg m) \\ P_f = P_f + ((2^{15} - P_f) \gg 8) \\ P_s = (P_m + P_f) \gg 1 \end{cases}.$$

The probability state $P_s$ is an average of both states Pm and Pl Each context model has a value m (being 4, 5, 6, or 7) that controls the probability updating speed for the model. The value m may be pre-determined and signaled in a slice header.

After the multi-hypothesis probability update, based on the resulting compound range R and a pre-defined range precision (e.g., 9-bit), the compound range R and the range offset L may be re-normalized into e.g. 9-bit (640), and the output bits from the range renormalization (640) are stored in the bitstream buffer (642), such that the bits can be output as a bit stream.

Figure 7:
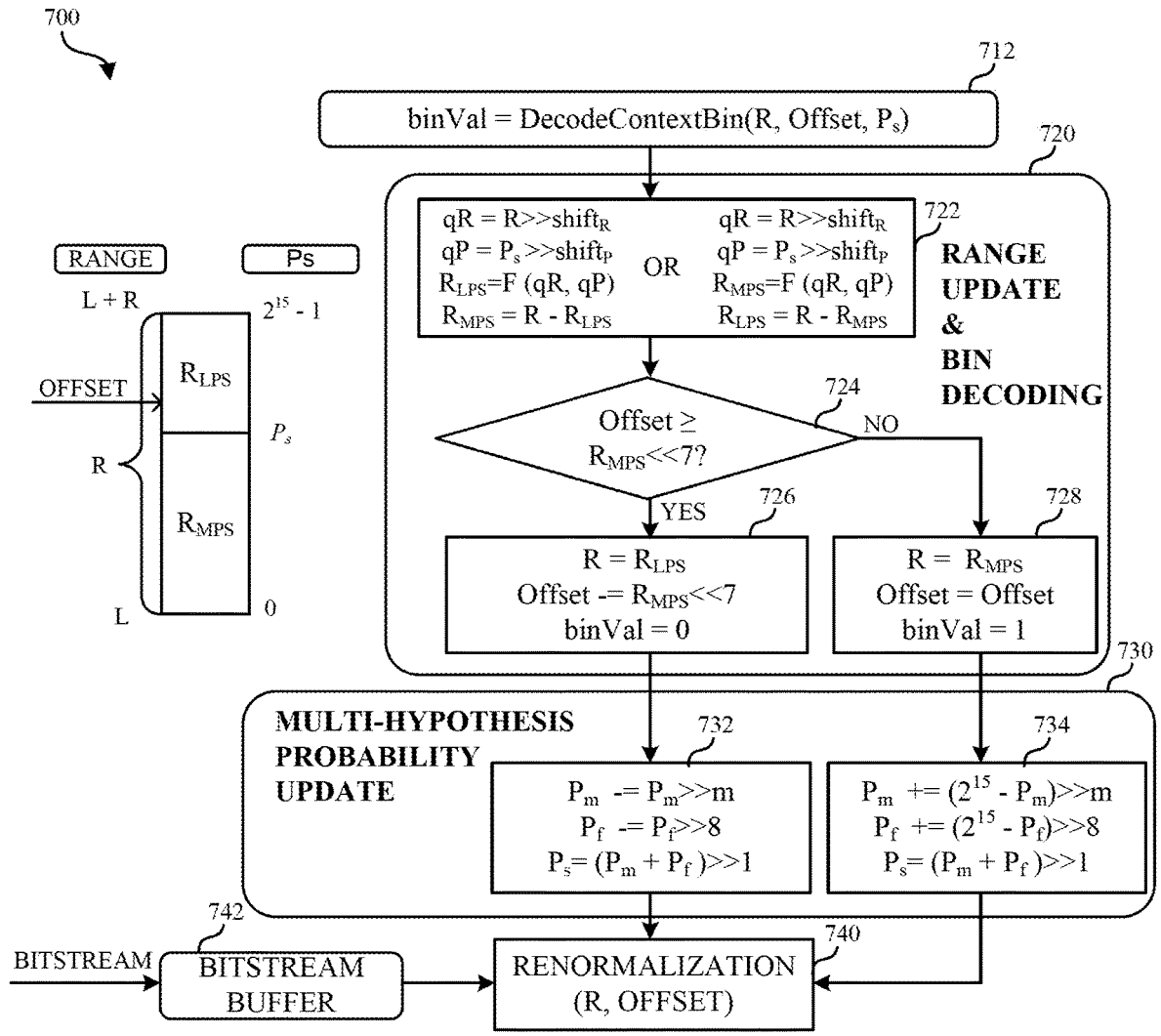
FIG. 7 illustrates a flow diagram of an example process of a binary arithmetic decoding engine for an architecture flexible binary arithmetic coding system in accordance with one or more implementations.

FIG. 7. Illustrates a flow diagram of an example process 700 performed by a binary arithmetic decoding engine for an architecture flexible binary arithmetic decoding system in accordance with one or more implementations. For explanatory purposes, the blocks of the process 700 are described herein as occurring in serial, or linearly. However, multiple blocks of the process 700 may occur in parallel. In addition, the blocks of the process 700 need not be performed in the order shown and/or one or more of the blocks of the process 700 need not be performed and/or can be replaced by other operations.

For example, the example process 700 may be performed by the binary arithmetic decoding engine 512 of FIG. 7. As discussed above, when the binary arithmetic decoding engine 512 receives the bitstream, the binary arithmetic decoding engine 512 may read the bits via range re-normalization, take the context of a current bin as an input, conduct a range update and bin decoding to determine the value of the current bin, and then perform probability update for the current bin.

The binary arithmetic decoding engine 512 receives the compound range R, a probability state $P_s$, and an offset value (Offset) (712) for the range update process (720). An LPS range and/or an MPS range may be calculated based on a multiplication function with a quantized range and a quantized probability state (722), instead of relying on a look-up table. In particular, the LPS range $R_{LPS}$ and/or the MPS range $R_{MPS}$ may be computed using a multiplication function involving the quantized compound range qR and the quantized probability state qP, a probability state shift bit $shift_p$, and a range shift bit $shift_R$.

In one or more implementations, if the LPS range $R_{LPS}$ is computed using a multiplication function F(qR,qP) and either an MPS probability state or an LPS probability state is used as the probability state $P_s$, the LPS range $R_{LPS}$ and the MPS range $R_{MPS}$ may be computed according to the following equation:

$$\begin{cases} qR = R \gg shift_R \\ qP = P_s \gg shift_P \\ R_{LPS} = F(qR, qP) \\ R_{MPS} = R - R_{LPS} \end{cases}$$

In one or more implementations, if the MPS range $R_{MPS}$ is computed using a multiplication function F(qR,qP) and either an MPS probability state or an LPS probability state is used as the probability state $P_s$, the MPS range $R_{MPS}$ and the LPS range $R_{LPS}$ may be computed according to the following equation:

$$\begin{cases} qR = R \gg shift_R \\ qP = P_s \gg shift_P \\ R_{MPS} = F(qR, qP) \\ R_{LPS} = R - R_{MPS} \end{cases}$$

As discussed above, the multiplication function F(qR,qP) may vary depending on whether the multiplication function F(qR,qP) is used to compute the LPS range $R_{LPS}$ or the MPS range $R_{MPS}$ and on whether the MPS probability state or the LPS probability state is used as the probability state $P_s$. In one or more implementations, if the multiplication function F(qR,qP) is used to compute the LPS range $R_{LPS}$ and the MPS probability state is used as the probability state $P_s$ or if the multiplication function F(qR,qP) is used to compute the MPS range $R_{MPS}$ and the LPS probability state is used as the probability state $P_s$, the multiplication function F(qR,qP) may be expressed as:

$$F(qR, qP) = \begin{cases} clip3(1, 2^{bits_R} - 1, (qR \cdot (2^{bits_P - shift_P} - qP)) \gg \\ \quad (bits_P - shift_P - shift_R)) & \text{if } qP \geq 1 \\ clip3(1, 2^{bits_R} - 1, (qR \cdot (2^{bits_P - shift_P} - 1)) \gg \\ \quad (bits_P - shift_P - shift_R)) & \text{Otherwise} \end{cases},$$

where the clipping function clip3 (a, b, x) clips x into the range of [a, b] and $bits_R$ represents a storage precision of compound range R and $bits_P$ represents a storage precision of probability state $P_s$.

In one or more implementations, if the multiplication function F(qR,qP) is used to compute the LPS range $R_{LPS}$ and the LPS probability state is used as the probability state $P_s$ or if the multiplication function F(qR,qP) is used to compute the MPS range $R_{MPS}$ and the MPS probability state is used as the probability state $P_s$, the multiplication function F(qR,qP) may be expressed as:

$$F(qR, qP) = \begin{cases} clip3(1, 2^{bits_R} - 1, (qR \cdot qP) \gg \\ \quad (bits_P - shift_P - shift_R)) & \text{if } qP \geq 1 \\ clip3(1, 2^{bits_R} - 1, qR \gg \\ \quad (bits_P - shift_P - shift_R)) & \text{Otherwise} \end{cases},$$

where a clipping function clip3 (a, b, x) clips x into the range of [a, b] and $bits_R$ represents a storage precision of compound range R and $bits_P$ represents a storage precision of the probability state $P_s$.

After computing the LPS range $R_{LPS}$ and the MPS range $R_{MPS}$, a range update and bin decoding process (720) is performed to update the compound range R, the offset value Offset, and the bin value binVal. In particular, it is determined whether the offset value Offset is greater than or equal to the MPS range $R_{MPS}$ being shift to the left by $shift_R$ (e.g., 7 bits) (724). If the offset value Offset is greater than or equal to the MPS range $R_{MPS}$ being shift to the left by $shift_R$ (e.g., 7 bits), the compound range R is set to the LPS range $R_{LPS}$, the offset value Offset is set to Offset−($R_{MPS}\ll 7$), and the bin value binVal is set to zero (726). If the offset value Offset is less than the MPS range $R_{MPS}$ being shift to the left by shift$_R$ (e.g., 7 bits), the compound range R is set to the MPS range R$_{MPS}$, the offset value Offset is unchanged, and the bin value binVal is set to one (728).

After the range update and bin decoding process (720), a multi-hypothesis probability update (730) is performed. The multi-hypothesis probability update (730) of FIG. 7 may be performed in a similar manner to the multi-hypothesis probability update (630) of FIG. 6. In particular, if the bin value binVal is set to zero, the probability state Ps is updated by the following equation (732):

$P_m = P_m - (P_m >> m)$ $P_f = P_f (P_f >> 8)$ $P_s = (P_m + P_f) >> 1$

If the bin value binVal is set to one (e.g., and the probability state storage precision bits$_P$ is 15), the probability state P$_s$ is updated by the following equation (734):

$$\begin{cases} P_m = P_m + ((2^{15} - P_m) \gg m) \\ P_f = P_f + ((2^{15} - P_f) \gg 8) \\ P_s = (P_m + P_f) \gg 1 \end{cases}$$

The probability state P$_s$ is an average of both states Pm and Pf. Each context model has a value m (being 4, 5, 6, or 7) that controls the probability updating speed for the model. The value m may be pre-determined and signaled in a slice header.

After the multi-hypothesis probability update, based on the resulting compound range R and the pre-defined range storage precision bits$_R$ (e.g., 9 bit), the compound range R and the range offset L is re-normalized into, e.g., 9-bit (740). The incoming bitstream may be loaded and stored in the bitstream buffer (742), and the bits from in the bitstream buffer (742) may be read via the compound range re-normalization (740) for decoding of the next bin.

In one or more implementations, an LPS range table or an MPS range table may be computed and pre-stored according to the multiplication function shown above, such that the LPS range R$_{LPS}$ may be determined by performing a table look-up on the LPS range table and/or the MPS range R$_{MPS}$ may be determined by performing a table look-up on the MPS range table.

In one or more implementations, the LPS range table (e.g., if the MPS probability state is used as the probability state P$_s$) or the MPS range table (e.g., if the LPS probability state is used as the probability state P$_s$) may be computed according to the following pseudo code in Table 1.

TABLE 1

Pseudo code for computing the LPS range table or the MPS range table (variant 1)

```
for (qP = 0; qP < 2^(bits_p-shift_p); qP + +) {
  for (qR = 2^(bits_R-shift_R-1); qR < 2^(bits_R-shift_R); qR + +) {
    if (qP ≥ 1) {
      rTab[qP][qR - 2^(bits_R-shift_R-1)] =
        clip3 (1, 2^(bits_R) - 1, (qR · (2^(bits_p-shift_p) - qP)) >> (bits_p - shift_p - shift_R))
    } else {
      rTab[qP][qR - 2^(bits_R-shift_R-1)] =
        clip3 (1, 2^(bits_R) - 1, (qR · (2^(bits_p-shift_p) -1)) >> (bits_p - shift_p - shift_R))
    }
  }
}
```

In one or more implementations, the LPS range table (e.g., if the LPS probability state is used as the probability state P$_s$) or the MPS range table (e.g., if the MPS probability state is used as the probability state P$_s$) may be computed according to the following pseudo code in Table 2.

TABLE 2

Pseudo code for computing the LPS range table or the MPS range table (variant 2)

```
for (qP = 0; qP < 2^(bits_p-shift_p); qP + +) {
  for (qR = 2^(bits_R-shift_R-1); qR < 2^(bits_R-shift_R); qR + +) {
    if (qP ≥ 1) {
      rTab[qP][qR - 2^(bits_R-shift_R-1)] =
        clip3 (1, 2^(bits_R) - 1, (qR · qP) >> (bits_p - shift_p - shift_R))
    } else {
      rTab[qP][qR - 2^(bits_R-shift_R-1)] =
        clip3 (1, 2^(bits_R) - 1, (qR) >> (bits_p - shift_p - shift_R))
    }
  }
}
```

In an example where $bits_P=15$, $shift_P=6$ and $bits_R=9$, $shift_R=2$, the LPS range table or the MPS range table computed using the pseudo code defined in Table 1 or the pseudo code defined in Table 2 may have the same size as the table defined by rTab[512][64], with 512×64 entries and 9-bit per entry. Thus, the LPS range or the MPS range may be expressed with quantized compound range qR and the quantized probability state qP as follows:

$$R_{LPS} = rTab[qP][qR-64]$$

or $$R_{MPS} = rTab[qP][qR-64].$$

In this case, the binary arithmetic coding engine and the binary arithmetic decoding engine may be similar to the binary arithmetic coding engine and the binary arithmetic decoding engine of FIG. 6 and FIG. 7, respectively, except that the LPS range $R_{LPS}$ may be computed by rTab[qP][qR−64] using the LPS range table as a look-up table, or that the MPS range $R_{MPS}$ may be computed by rTab[qP][qR−64] using the MPS range table as a look-up table.

The size of the LPS range table or the size of the MPS range table depends on the values of $bits_P$, $shift_P$, $bits_R$, and $shift_R$. Thus, by changing $shift_P$ from 6 to 7, in an example where $bits_P=15$, $shift_P=7$, and $bits_R=9$, $shift_R=2$, the LPS range table size is reduced by half (e.g., in Table 1). Although the LPS range table or the MPS range table is reduced, the same compression efficiency as the look-up table using $bits_P=15$, $shift_P=6$ and $bits_R=9$, $shift_R=2$ may be achieved.

Thus, for example, if $bits_P=15$, $shift_P=7$, and $bits_R=9$, $shift_R=2$ and if qR is in 7-bit and qP is in 8-bit, the $R_{LPS}$ range calculation or the $R_{MPS}$ range calculation can be realized either by using a multiplication operation involving a 7-bit by 8-bit multiplication plus shifts, or by a table look-up operation using an LPS range table or an MPS range table of size 18,432 bytes (e.g., 256×64×9 bits). As discussed above, using a multiplication operation is less costly than using a table look-up operation.

Figure 8:
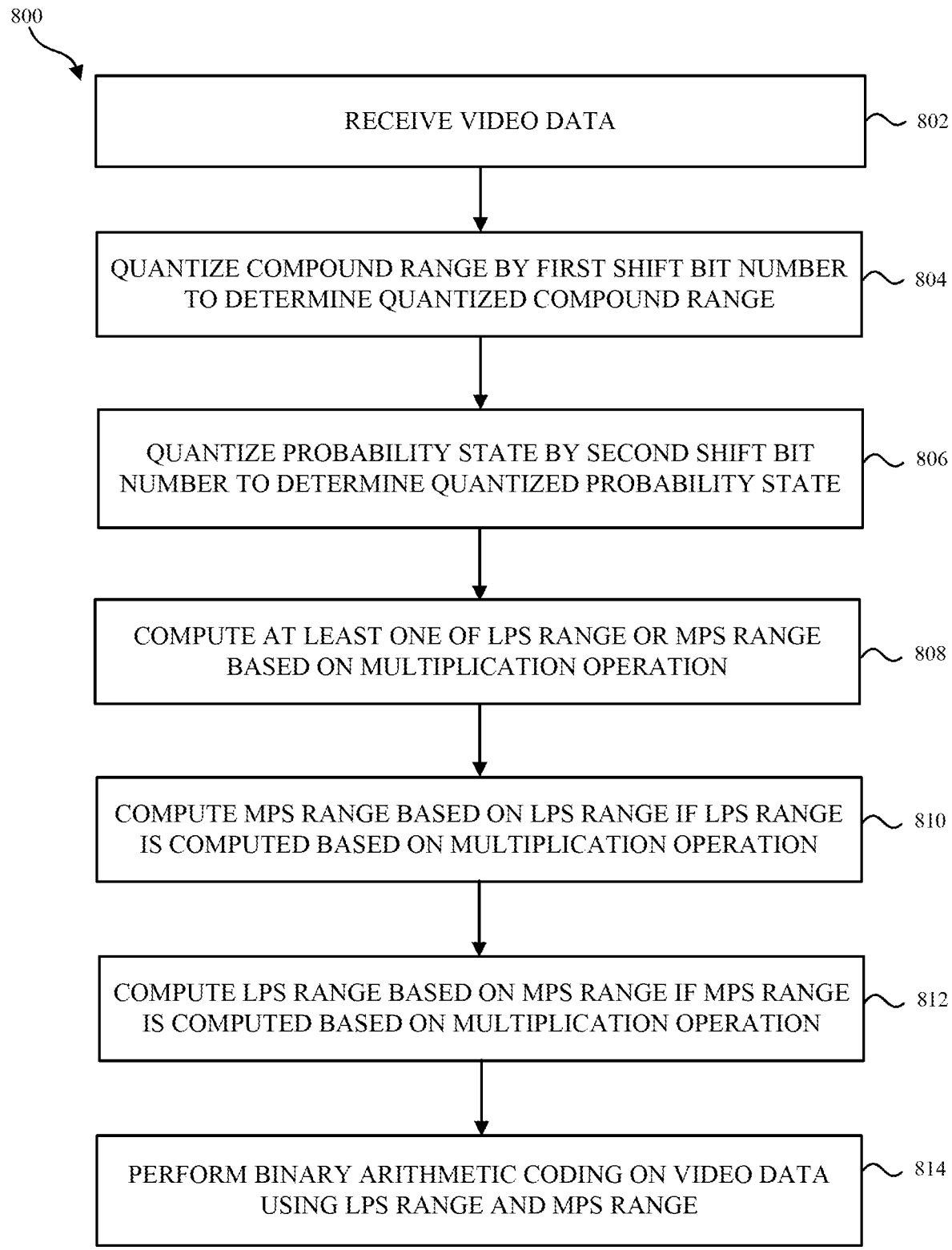
FIG. 8 illustrates a flow diagram of an example process of an architecture flexible binary arithmetic coding system in accordance with one or more implementations.

FIG. 8 illustrates a flow diagram of example process 800 of an architecture flexible binary arithmetic coding system in accordance with one or more implementations. For explanatory purposes, the process 800 is primarily described herein with reference to electronic device 102 of FIGS. 1-2. However, the process 800 is not limited to the electronic device 102, and one or more blocks (or operations) of the process 800 may be performed by one or more other components of the electronic device 102. The electronic device 102 also is presented as an exemplary device and the operations described herein may be performed by any suitable device. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more of the blocks of the process 800 need not be performed and/or can be replaced by other operations.

In the process 800 of the flexible binary arithmetic coding system, the video coding component 208 of the electronic device 102 receives video data (e.g., via the communication interface 206) (802). The video coding component 208 may receive the video data from another device (e.g., server 104) via the communication interface 206, or may receive the video data from the memory 204 via the host processor 202. The received video data may be processed by the CABAC, which includes a binary arithmetic coding engine to encode the video data and/or a binary arithmetic decoding engine to decode the compressed video data.

The video coding component 208 quantizes a compound range by a first shift bit number to determine the quantized compound range (804). The video coding component 208 quantizes a probability state by a second shift bit number to determine the quantized probability state (806). The probability state may be the MPS probability state of the MPS or the LPS probability state of the LPS. For example, as discussed above, the quantized compound range qR may be computed by shifting the compound range R by the range shift bit $shift_R$, and the quantized probability state qP may be computed by shifting the probability state $P_s$ by the range shift bit $shift_P$. The first shift bit number and/or the second shift bit number may be configurable (e.g., by an input).

The video coding component 208 computes at least one of an LPS range or an MPS range based on a multiplication operation (808). In one or more implementations, the at least one of the LPS range or the MPS range may be computed without performing a table look-up. As discussed above, when computing the LPS range (and/or the MPS range), the multiplication operation may be less costly than the table look-up operation.

The multiplication operation may include multiplication of a quantized compound range and a storage precision based value based on the quantized probability state if the LPS range is computed based on the multiplication operation and an MPS probability state of the MPS is used as the probability state or if the MPS range is computed based on the multiplication operation and an LPS probability state of the LPS is used as the probability state. The storage precision based value may be computed based on a storage precision of the probability state. In particular, the storage precision based value may be determined by: subtracting the quantized probability state from a power-of-two value based on the difference between the storage precision of the probability state and the second shift bit number if the quantized probability state is greater than or equal to 1, and subtracting 1 from the power-of-two value if the quantized probability state is less than 1. For example, as discussed above, the storage precision based value may be $(2^{bits_P - shift_P} - qP)$ if the quantized probability state qP is greater than or equal to 1 and may otherwise be $(2^{bits_P - shift_P} - 1)$.

The multiplication operation may include multiplication of the quantized compound range and a quantized probability state based value based on the quantized probability state if the LPS range is computed based on the multiplication operation and the LPS probability state of the LPS is used as the probability state or if the MPS range is computed based on the multiplication operation and the MPS probability state of the MPS is used as the probability state. The quantized probability state based value may be the quantized probability state if the quantized probability state is greater than or equal to 1, and the quantized probability state based value may be 1 if the quantized probability state is less than 1. For example, as discussed above, the quantized probability state based value may be the quantized probability state qP if the quantized probability state qP is greater than or equal to 1 and may otherwise be 1.

In one or more implementations, the at least one of the LPS range or the MPS range may be computed by: shifting a multiplication result from the multiplication operation by a third shift bit number, the third shift bit number being calculated by subtracting the first shift bit number and the second shift bit number from the storage precision of the probability state, and applying a clipping function that clips the shifted multiplication result into a range of 1 and a second storage precision based value that is computed based on a storage precision of the compound range. For example, as discussed above, to compute the at least one of the LPS range $R_{LPS}$ or the MPS range $R_{MPS}$, the multiplication result produced from the multiplication operation is shifted to right by ($bits_P$–$shift_P$–$shift_R$) and the clipping function clip3 is applied the shifted multiplication result into the range of 1 and $2^{bits_R}$–1.

The video coding component 208 may compute MPS range based on the LPS range if the LPS range is computed based on the multiplication operation (810). For example, the MPS range may be computed by subtracting the LPS range from the compound range when the LPS range is computed based on the multiplication operation. The video coding component 208 may compute the LPS range based on the MPS range if the MPS range is computed based on the multiplication operation (812). For example, the LPS range may be computed by subtracting the MPS range from the compound range when the MPS range is computed based on the multiplication operation.

The video coding component 208 performs binary arithmetic coding (e.g., coding or decoding) on the video data using the LPS range and the MPS range (814). The video data may be coded by encoding the video data (e.g., video data received from the memory 204) or decoding the video data (e.g., video data that has been encoded and received from another device). For example, using the LPS range and the MPS range, the processes of the binary arithmetic coding (e.g., shown in FIG. 6) or the processes of the binary arithmetic decoding (e.g., shown in FIG. 7) may be performed.

FIGS. 9A and 9B illustrate tables 900A and 900B showing experimental results to demonstrate a compression efficiency difference between computing the LPS range (e.g., LPS range $R_{LPS}$) based on a table look-up operation and computing the LPS range (e.g., LPS range $R_{LPS}$) based on a multiplication operation according to one or more implementations in an architecture flexible binary arithmetic coding system. As shown on the left side of the tables 900A of FIG. 9A and 900B of FIG. 9B, the compression efficiency for the table look-up operation and the compression efficiency for the multiplication operation are approximately the same (i.e., where the difference is mostly near zero). Thus, the experimental results show that using the multiplication operation to compute the LPS range $R_{LPS}$ can provide a most cost effective approach to provide the same compression efficiency as the table look-up operation.

Figure 10:
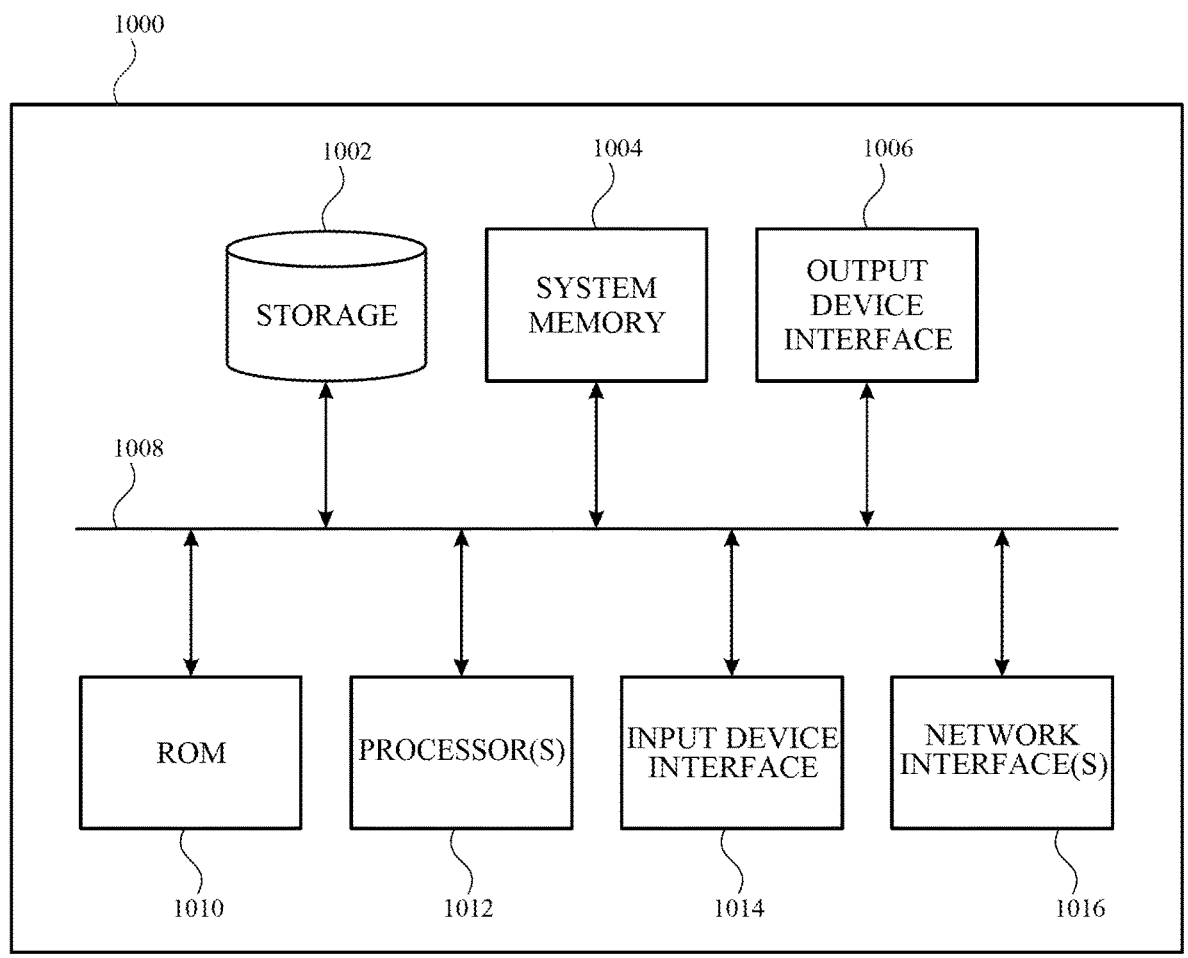
FIG. 10 illustrates an example electronic system with which aspects of the subject technology may be implemented in accordance with one or more implementations.

FIG. 10 illustrates an electronic system 1000 with which one or more implementations of the subject technology may be implemented. The electronic system 1000 can be, and/or can be a part of, one or more of the electronic device 102 and/or the server 104 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the server 104 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying," means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other embodiments. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A device, comprising:
   one or more processors configured to cause:
      receiving video data;
      computing a quantized range by shifting a first range by a first shift number;
      computing a least probable symbol (LPS) range based on a multiplication operation and a shift operation using a second shift number, wherein the multiplication operation is based on the quantized range and a probability state;
      computing a second range by subtracting the LPS range from the first range;
      depending on an offset and the second range, determining whether to re-set the first range to the LPS range;
      performing arithmetic decoding on the video data using the LPS range, the quantized range, and the offset; and
      providing the decoded video data.

2. The device of claim 1, wherein the one or more processors are configured to cause:
   after computing the second range, decrementing the offset based on the second range.

3. The device of claim 1, wherein the first shift number is a pre-defined number.

4. The device of claim 1, wherein the video data is associated with a bin,
   wherein the probability state is an LPS probability state; and
   wherein the one or more processors are configured to cause:
      after computing the second range, computing a bin value based on the offset and the second range; and
      updating a value associated with the LPS probability state, based on the bin value.

5. The device of claim 1,
   wherein the video data is associated with a bin,
   wherein the one or more processors are configured to cause:
      performing a comparison based on the offset and the second range; and
      based on the comparison,
         computing a bin value;
         decrementing the offset; and
         re-setting the first range to the LPS range, and
   wherein performing the arithmetic decoding comprises performing the arithmetic decoding on the video data using the LPS range, the quantized range, the offset, and the second range.

6. The device of claim 5, wherein the one or more processors are configured to cause:
   updating a value associated with the probability state, based on the bin value.

7. The device of claim 6, wherein the one or more processors are configured to cause:
   renormalizing the first range; and
   renormalizing the offset.

8. A method, comprising:
   receiving video data;
   computing a quantized range by shifting a first range by a first shift number;
   computing a least probable symbol (LPS) range based on a multiplication operation and a shift operation using a second shift number, wherein the multiplication operation is based on the quantized range and a probability state;
   computing a second range by subtracting the LPS range from the first range;
   depending on an offset and the second range, determining whether to re-set the first range to the LPS range;
   performing arithmetic decoding on the video data using the LPS range, the quantized range, and the offset; and
   providing the decoded video data.

9. The method of claim 8, comprising:
   after computing the second range, decrementing the offset based on the second range.

10. The method of claim 8,
    wherein the video data is associated with a bin,
    wherein the method comprises:
       performing a comparison based on the offset and the second range; and
       based on the comparison,
          computing a bin value;
          decrementing the offset; and
          re-setting the first range to the LPS range, and
    wherein performing the arithmetic decoding comprises performing the arithmetic decoding on the video data using the LPS range, the quantized range, the offset, and the second range.

11. The method of claim 10, comprising:
    updating a value associated with the probability state, based on the bin value.

12. A non-transitory, processor-readable storage media comprising instructions that, when executed by one or more processors, perform a method comprising:
    receiving video data;
    computing a quantized range by shifting a first range by a first shift number;
    computing a least probable symbol (LPS) range based on a multiplication operation and a shift operation using a second shift number, wherein the multiplication operation is based on the quantized range and a probability state;

computing a second range by subtracting the LPS range from the first range;

depending on an offset and the second range, determining whether to re-set the first range to the LPS range;

performing arithmetic decoding on the video data using the LPS range, the quantized range, and the offset; and providing the decoded video data.

13. The non-transitory, processor-readable storage media of claim 12, wherein the method comprises: decrementing the offset based on the second range.

14. The non-transitory, processor-readable storage media of claim 12, wherein the video data is associated with a bin, wherein the method comprises:

performing a comparison based on the offset and the second range; and based on the comparison, computing a bin value;

decrementing the offset; and re-setting the first range to the LPS range, and wherein performing the arithmetic decoding comprises performing the arithmetic decoding on the video data using the LPS range, the quantized range, the offset, and the second range.

15. The device of claim 1, wherein the one or more processors are configured to cause:

performing the multiplication operation of the LPS range without using a look-up table.

16. The device of claim 1, wherein the one or more processors are configured to cause:

depending on the offset and the second range, determining whether to decrement the offset;

based on the determining to re-set, re-setting the first range to the LPS range; and based on the determining to decrement, decrementing the offset.

17. The device of claim 1, wherein the one or more processors are configured to cause computing the LPS range based further on a third shift number.

18. The device of claim 17, wherein the third shift number is same as the first shift number.

\* \* \* \* \*